(12) United States Patent
Fu et al.

(10) Patent No.: US 10,091,765 B2
(45) Date of Patent: Oct. 2, 2018

(54) METHOD FOR BLUETOOTH DATA FORWARDING, ELECTRONIC DEVICE, BLUETOOTH DEVICE, AND BLUETOOTH SYSTEM

(71) Applicant: SMARTECH WORLDWIDE LIMITED, Tortola (VG)

(72) Inventors: Yunhe Fu, Shenzhen (CN); Tony Xie, Hong Kong (CN); Mid Wang, Hong Kong (CN)

(73) Assignee: SMARTECH WORLDWIDE LIMITED, Tortola (VG)

( * ) Notice: Subject to any disclaimer, the term of this patent is extended or adjusted under 35 U.S.C. 154(b) by 0 days.

(21) Appl. No.: 15/848,025

(22) Filed: Dec. 20, 2017

(65) Prior Publication Data

US 2018/0192396 A1  Jul. 5, 2018

(30) Foreign Application Priority Data

Dec. 29, 2016  (CN) .......................... 2016 1 1246067

(51) Int. Cl.
*H04W 72/00* (2009.01)
*H04W 4/80* (2018.01)
*H04W 88/04* (2009.01)

(52) U.S. Cl.
CPC ........... *H04W 72/005* (2013.01); *H04W 4/80* (2018.02); *H04W 88/04* (2013.01)

(58) Field of Classification Search
CPC ...... H04W 72/005; H04W 4/80; H04W 88/04

USPC ......................................................... 455/41.2
See application file for complete search history.

(56) References Cited

U.S. PATENT DOCUMENTS

| | | | |
|---|---|---|---|
| 2012/0058727 A1* | 3/2012 | Cook | H04R 5/02 455/41.3 |
| 2015/0245184 A1* | 8/2015 | Govande | H04M 3/54 455/417 |

FOREIGN PATENT DOCUMENTS

| | | |
|---|---|---|
| CN | 1836410 A | 9/2006 |
| CN | 101521624 A | 9/2009 |
| CN | 102137498 A | 7/2011 |
| CN | 103401804 A | 11/2013 |
| CN | 103974338 A | 8/2014 |
| CN | 104918290 A | 9/2015 |
| WO | 2012109932 A1 | 8/2012 |

\* cited by examiner

*Primary Examiner* — Ayodeji Ayotunde
(74) *Attorney, Agent, or Firm* — IPro, PLLC; Na Xu

(57) ABSTRACT

A method for forwarding Bluetooth data, an electronic device, a Bluetooth device, and a Bluetooth system are disclosed. The method includes: in a Bluetooth communication process, receiving source data from a data output device as cached data, and forwarding the source data; and preferentially allocating a Bluetooth communication bandwidth to receive the source data if a data volume of the cached data is less than a first predetermined threshold; or preferentially allocating a Bluetooth communication bandwidth to forward the source data if a data volume of to-be-forwarded source data is greater than a second predetermined threshold.

13 Claims, 4 Drawing Sheets

METHOD FOR BLUETOOTH DATA FORWARDING, ELECTRONIC DEVICE, BLUETOOTH DEVICE, AND BLUETOOTH SYSTEM

CROSS-REFERENCE TO RELATED APPLICATIONS

The present disclosure claims priority to Chinese Patent Application No. 201611246067.9, filed with the Chinese Patent Office on Dec. 29, 2016, titled "METHOD AND APPARATUS FOR DATA FORDING BLUETOOTH DEVICE AND METHOD FOR STEREO AUDIO TRANSMISSION BASED ON A2DP", the entire contents of which are incorporated herein by reference.

TECHNICAL FIELD

The present disclosure relates to the technical field of Bluetooth, and in particular, relates to a method for Bluetooth data forwarding, an electronic device, a Bluetooth device, Bluetooth system and a method for stereo audio transmission.

BACKGROUND

Various types of wireless transmission devices, for example, smart phones, Bluetooth headphones, MP3 players and the like, have been extensively applied. Most wireless transmission devices support Bluetooth transmission of audios and other types of data. In the Bluetooth protocol (A2DP profile), one data output source (for example, a smart phone, an MP3 player or the like) may be only connected to one audio playback device, and transmit data via Bluetooth to an audio playback device for playback. In some scenarios, the data output device needs to transmit data to two or more than two audio playback devices. For example, the stereo headphone requires that left and right-channel playback devices are both wirelessly connected to the data output source. In case of data reception, the playback device in one channel (for example, the left headphone) only acts as a primary headphone to receive the data transmitted by the data output source. Then the data is transmitted to the playback device in the other channel via Bluetooth or other non-Bluetooth transmission protocols.

SUMMARY

An embodiment of the present disclosure provides a method for Bluetooth data forwarding. The method includes:

in a Bluetooth communication process, receiving source data from a data output device as cached data, and forwarding the source data; and preferentially allocating a Bluetooth communication bandwidth to receive the source data if a data volume of the cached data is less than a first predetermined threshold; or preferentially allocating a Bluetooth communication bandwidth to forwarding the source data if a data volume of to-be-forwarded source data is greater than a second predetermined threshold.

Another embodiment of the present disclosure provides an electronic device. The electronic device includes:

a memory, a communication module and a processor coupled to the memory and the communication module;

the memory storing instructions that are executable by the processor, wherein execution of the instructions by the processor causes the processor via the communication module to:

in a Bluetooth communication process, receiving source data from a data output device as cached data, and forwarding the source data; and preferentially allocating a Bluetooth communication bandwidth to receive the source data if a data volume of the cached data is less than a first predetermined threshold; or preferentially allocating a Bluetooth communication bandwidth to forward the source data if a data volume of to-be-forwarded source data is greater than a second predetermined threshold.

Still another embodiment of the present disclosure further provides a Bluetooth device. The Bluetooth device includes:

a master device configured to receive source data from a data output source and forward the source data, and at least one slave devices configured to receive the forwarded source data; wherein the master device includes a Bluetooth communication module, a memory and a processor coupled to the Bluetooth communication module and the memory, wherein the memory is configured to store instructions executable by the processor, the processor is configured to execute the instructions and multiplex in a time division manner the Bluetooth communication module to: in a Bluetooth communication process, receive source data from a data output device as cached data, and forward the source data;

wherein a Bluetooth communication bandwidth is preferentially allocated to receive the source data if a data volume of the cached data is less than a first predetermined threshold; or a Bluetooth communication bandwidth is preferentially allocated to forward the source data if a data volume of to-be-forwarded source data is greater than a second predetermined threshold.

Still another embodiment of the present disclosure further provides a Bluetooth system. The Bluetooth system includes a data output device configured to provide source data, a first device configured to establish Bluetooth communication with the data output device, and second devices; wherein the first device is a slave device relative to the data output device, and is a master device relative to the second devices;

the first device is configured to source data sent by the data output device and cache the source data, and preferentially allocate a Bluetooth communication bandwidth to receive the source data if a data volume of the cached data is less than a first predetermined threshold; and the first device is configured to forward the received source data to the second devices, and preferentially allocate a Bluetooth communication bandwidth to forward the source data if a data volume of to-be-forwarded source data is greater than a second predetermined threshold.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

DETAILED DESCRIPTION

In order to make the objectives, technical solutions, and advantages of the present disclosure clearer, the present disclosure is further described in detail below by reference to the embodiments and the accompanying drawings. It should be understood that the specific embodiments described herein are only intended to explain the present disclosure instead of limiting the present disclosure.

In Bluetooth, a Bluetooth device does not need to practice all the Bluetooth specifications. For compatibility between different Bluetooth devices, some application-specific profiles are defined in the Bluetooth specifications, which are used to define how to implement a connection or application between Bluetooth devices.

The Advanced Audio Distribution Profile (A2DP) is a subset in the above described Bluetooth profiles. The A2DP is dedicated to transfer of stereo audios via the Bluetooth. In a case where two Bluetooth devices both support the profile, the stereo audios may be transferred via the Bluetooth.

Bluetooth is a point-to-point or point-to-multipoint topological structure. However, interactions therebetween are all based on a physical channel. Point-to-multipoint may share one physical channel. In a piconet based on the same physical channel, a hardware device may serve as a master device or a slave device. The specific device role may be defined by the device randomly, to implement the corresponding control function (one piconet has only one master device). Nevertheless, an intersection is allowed to exist between different piconets. That is, the slave device in one piconet may serve as the master device on another piconet.

Figure 1:
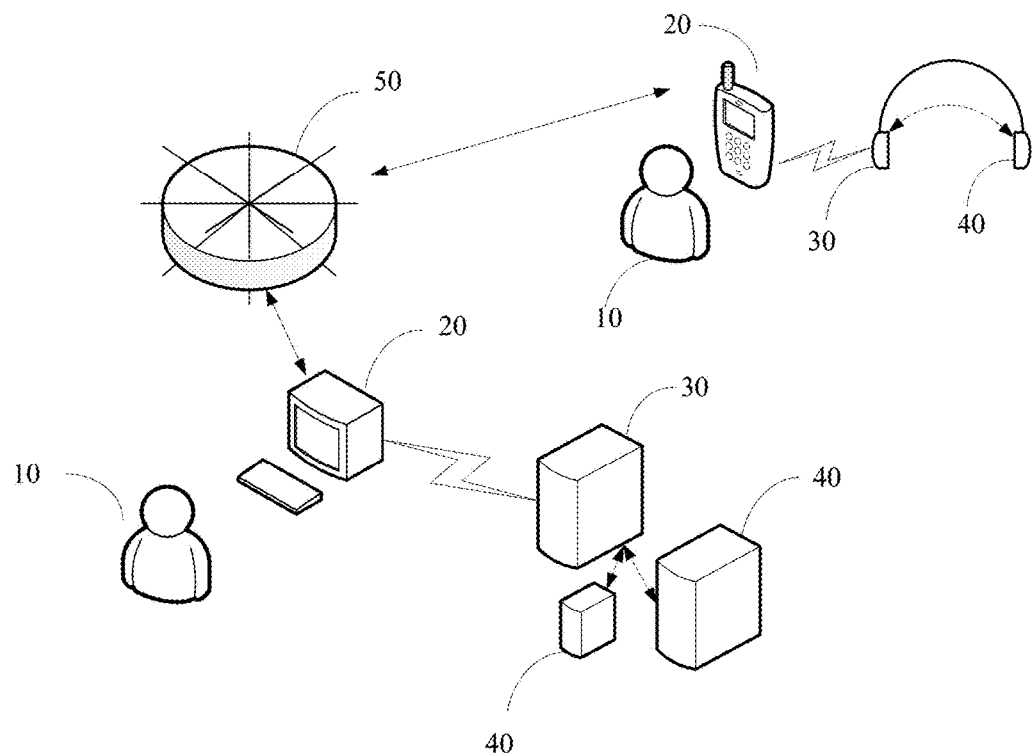
FIG. 1 is a schematic diagram of an application environment according to an embodiment of the present disclosure.

FIG. 1 illustrates an application environment where stereo audios are transferred via the A2DP according to an embodiment of the present disclosure. As illustrated in FIG. 1, the application environment includes: a user 10, a data output device 20, a multi-channel playback device (including a first audio playback device 30 and a second audio playback device 40), and a network 50.

The user 10 may be a group having the same or similar operation behaviors in any number, for example, a family, a work group or individuals. The user 10 may interact with the data output device 20 and/or the multi-channel playback device by using one or a plurality of user interaction device of any suitable type, for example, a mouse, a keypad, a remote control, a touch screen, a motion sensing camera, or a smart wearable device, input instructions or control the data output device 20 and/or the multi-channel playback device to perform one or a plurality of operations, for example, a stereo audio playback operation.

The data output device 20 may be a suitable electronic device that supports A2DP and provides one or a plurality of audio contents, for example, a smart phone, a tablet computer, an MP3 player, a personal computer, a laptop computer, a personal audio device, a CD player, or any other smart/non-smart terminal device. The data output device 20 is coupled to at least one storage medium configured to store audio data, and acquires audio data. The data output device 20 may also be a combination of one or a plurality of electronic devices, for example, a smart phone and a digital-to-analog converter (DAC) connected thereto.

The multi-channel playback device may include a first audio playback device 30 and a second audio playback device 40. The multi-channel playback device may be a suitable electronic device that supports the A2DP and is capable of playing audio data, for example, a stereo headphone, a 2.1 channel speaker, a 5.1 channel audio device, a stereo speaker or any other suitable speaker group. The first audio playback device and the second audio playback device 40 are merely used to represent speaker parts for playback in different sound channels. For example, for a stereo headphone, the first audio playback device 30 may be a left-channel headphone and the second audio playback device 40 may be a right-channel headphone, or for a 2.1 channel speaker, the first audio playback device 30 may be a bass speaker and the second audio playback device 40 is a left-channel and right-channel speaker.

The first audio playback device 30 is communicatively connected to the second audio playback device 40 via a Bluetooth module, for data forwarding therebetween. In some embodiments, other communication modules may also be configured for communicative connection, for example, a WiFi module.

The data output device 20 may establish a Bluetooth connection with the multi-channel audio playback device according to a user instruction, and transfer audio data based on A2DP. In this embodiment, the data output device 20 may establish a Bluetooth connection with the first audio playback device 30, and serve as a master device to send corresponding stereo audio data. The first audio playback device 30 may also forward the stereo audio data to the second audio playback device 40 via Bluetooth communication for playback.

The network 50 may be a suitable wired or wireless network that implements communication between two electronic devices, for example, the Internet, a local area network or a cabled network. The data output device 20 has at least one network interface, establishes a communication connection with the network 50, and acquires corresponding audio data or instructions from the network 50. Nevertheless, the data output device 20 may also have at least one local storage device, and acquire corresponding audio data from the local storage device. In some other embodiments, some devices may be added or removed according to the actual needs. For example, the network 50 may be removed or an additional user interaction device may be added.

In a stereo audio transmission process, the user 10 sends an instruction to the data output device 20 (for example, a smart phone). Under A2DP, the data output device 20 sends audio data to the first audio playback device via Bluetooth according to the user's instruction.

During the playback process, the first audio playback device 30 may firstly cache a portion of the received audio data, and forward the audio data to the second audio playback device 40 via Bluetooth communication.

The process of receiving data and forwarding data may be practiced by multiplexing the Bluetooth communication module of the first audio playback device in a time division manner, and the function implemented by the Bluetooth communication module may be switched according to actual needs. In the time-division multiplexing of the first audio playback device 30, according to the volume of the cached data or the to-be-forwarded data, the Bluetooth communication bandwidths allocated to receive data and forward data may be dynamically adjusted.

Adjustment of the Bluetooth communication bandwidth may be implemented by adjusting usage time of the Bluetooth communication module. For example, through adjustment, 50% of the time is used for receiving data, and the remaining time is used for forwarding data. In this case, the Bluetooth communication bandwidth is averagely allocated.

For ease of description, the first audio playback device 30 receiving the audio data output by the data output device may be referred to as the master device, and the remaining second audio playback devices 40 receiving the audio data forwarded by the master device may be referred to as slave devices. In the process of outputting stereo audio process by the data output device 20, any one audio playback device may be selected from a multi-channel audio playback device to establish a Bluetooth communication connection (that is, the master device), and transmit the stereo audio data based on A2DP.

In the environment as illustrated in FIG. 1, relative to the data output device 20 and the first audio playback device 30, the data output device 20 serves as the master device; on the contrary, relative to the first audio playback device 30 and the second audio playback device 40, the first audio playback device 30 serves as the master device.

The terms "master device" and "slave device" used herein are merely represents roles of hardware devices in the piconet. In practice, the roles of the devices may be exchanged according to actual needs. For example, a second audio playback device may also serve as the master device in terms of role, which receives the stereo audio data output by the data output device.

Although FIG. 1 only illustrates two users 10, two data source output devices 20, two first audio playback devices 30, and three second audio playback devices 40, a person skilled in the art should understand that in practical application, the application environment may include more users 10, more data source output devices 20, more first audio playback devices 30 or more second audio playback devices 40.

In addition, the application environment according to the embodiment as illustrated in FIG. 1 is described using A2DP-based Bluetooth audio transmission as an example. However, the method for forwarding Bluetooth data according to the embodiment of the present disclosure may also be applied to any suitable scenario where data needs to be transmitted from one data source output device to a plurality of different data receiving devices via Bluetooth transmission, but is not limited to application of stereo audio transmission based on A2DP.

Figure 2:
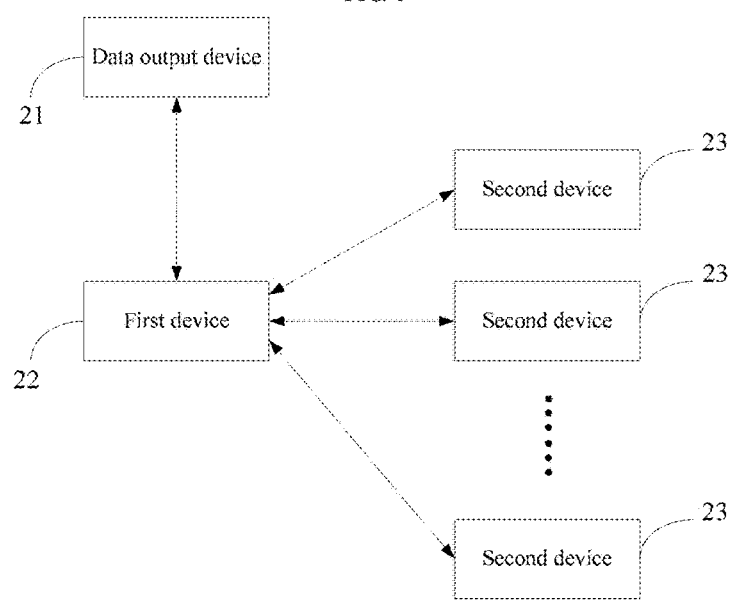
FIG. 2 is a schematic structural diagram of a Bluetooth system according to an embodiment of the present disclosure.

FIG. 2 illustrates a Bluetooth communication system according to an embodiment of the present disclosure. The Bluetooth communication system is used in the application environment as illustrated in FIG. 1, and may include: a data output device 21 serving as a data source, and a data playback device. The data playback device includes a first device 22 and several second devices 23. The first device 22 and the second device 23 are devices having specific roles in the Bluetooth communication system, instead of fixed hardware devices.

The first device 22 is configured to receive source data provided by the data output device, and forward the source data to the second devices 23. The first device 22 may dynamically adjust, according to actual data transmission, channel quality and the like factors, the Bluetooth communication bandwidth allocated to receive data and forward data, to ensure stability and continuity of the data playback device in a data playback process.

In the Bluetooth communication system, as described above, the first device 22 serves as the master device relative to the second devices 23, but serves as the slave device relative to the data output device 21. As such, the first device may better tune a frequency modulation channel to avoid data conflict in data communication (for example, while the data output device 21 sends data to the first device 22, the second devices 23 also send data to the first device 22).

In addition, in the Bluetooth communication system, the data playback devices formed by the first device 22 and the second devices 23 forward data therebetween via Bluetooth communication too, with no need of additionally configuring another wireless transmission module.

Figure 3:
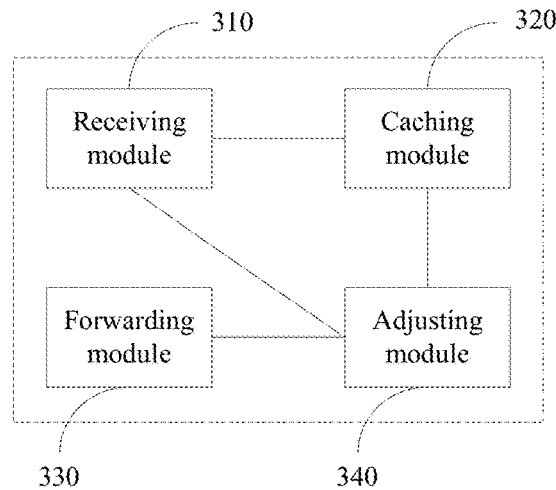
FIG. 3 is a functional block diagram of an apparatus for forwarding Bluetooth data according to an embodiment of the present disclosure.

FIG. 3 illustrates an apparatus for forwarding Bluetooth data according to an embodiment of the present disclosure. The apparatus for forwarding Bluetooth data may be practiced in the first device 22 as illustrated in FIG. 2, such that the first device 22 may dynamically adjust, according to actual data transmission, channel quality and the like factors, the Bluetooth communication bandwidth allocated to receive data and forward data, and thus reasonably allocate the bandwidth resources. As illustrated in FIG. 3, the apparatus for forwarding Bluetooth data includes: a receiving module 310, a caching module 320, a forwarding module 330 and an adjusting module 340.

The receiving module 310 is configured to receive source data from a data output device as cached data in a Bluetooth communication process. The caching module 320 is configured to store the cached data. The forwarding module 330 is configured to forward the source data in the Bluetooth communication process. The adjusting module 340 is configured to: preferentially allocate a Bluetooth communication bandwidth to the receiving module if a data volume of the cached data is less than a first predetermined threshold; or preferentially allocate a Bluetooth communication bandwidth to the forwarding module if a data volume of to-be-forwarded source data is greater than a second predetermined threshold.

In a practical Bluetooth communication process, the receiving module 310 and the forwarding module 330 of the first device simultaneously work, and share the Bluetooth communication module of the first device to implement the corresponding function of receiving data or forwarding data. The caching module 320 caches a specific amount of received data according to actual needs.

The adjusting module 340 determines the bandwidths to be allocated to the receiving module 310 and the forwarding module 330 according to a data volume of the cached data and a data volume of the to-be-forwarded data or a proportion therebetween. For example, 70% of the bandwidths may be allocated to the receiving module 310, and the remaining 30% of the bandwidths may be allocated to the data forwarding module 330. In some embodiments, the modules 310 to 340 as illustrated in FIG. 3 may further perform the other suitable methods or a combination thereof in the method embodiments.

Figure 4:
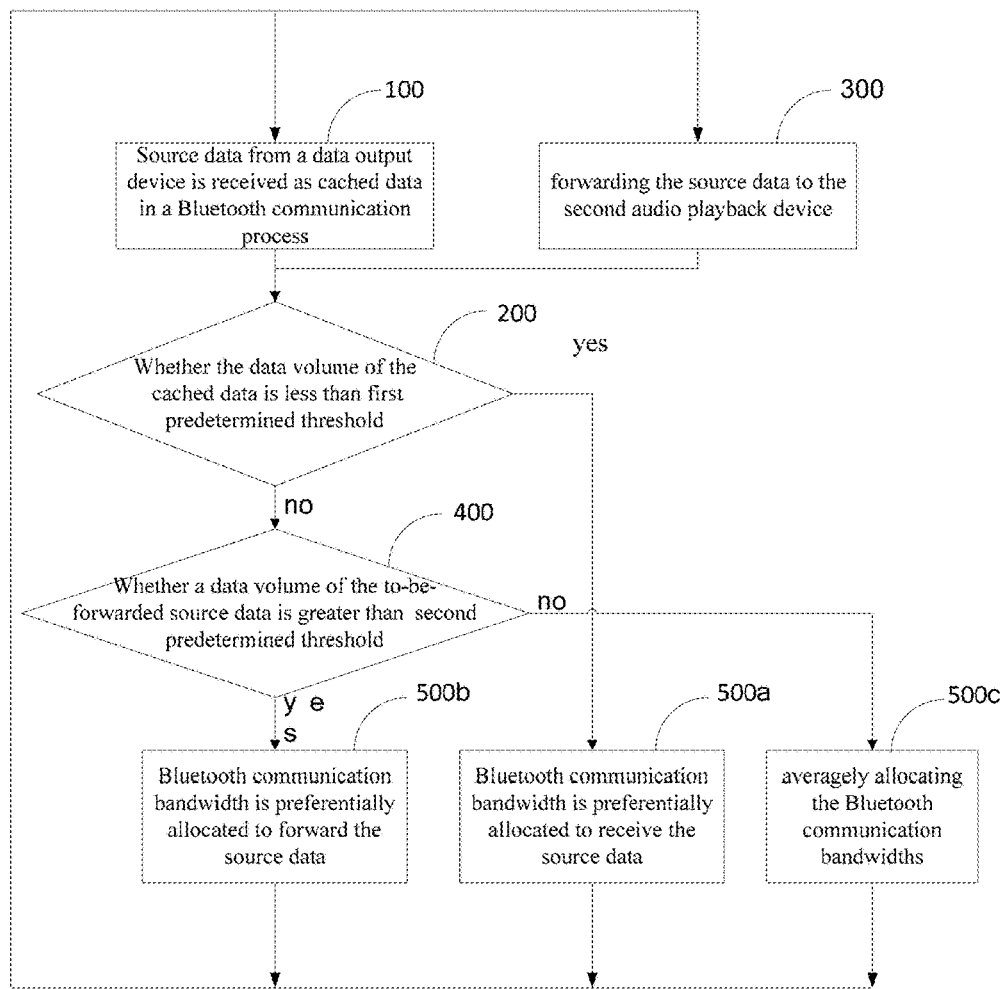
FIG. 4 is a flowchart of a method for forwarding Bluetooth data according to an embodiment of the present disclosure.

FIG. 4 is a flowchart of a method for forwarding Bluetooth data according to an embodiment of the present disclosure. The method may be performed by the first device for receiving the data output by the data output device as illustrated in FIG. 2, or the apparatus for forwarding Bluetooth data as illustrated in FIG. 3.

As illustrated in FIG. 4, the method for forwarding Bluetooth data includes the following steps:

100: Source data from a data output device is received as cached data in a Bluetooth communication process. To ensure the continuity in a data playback process by a Bluetooth device, generally the received data is cached instead of being directly played. For example, with respect audio data playback, 80 ms audio data may be cached, such that an audio playback device is still capable of uninterruptedly playing music even if the data fails to be received due to various factors (the data loss is less than 80 ms).

A data volume of the cached data is actually determined by the speeds of playing the data and receiving the source data by the Bluetooth device. For example, if the quality of communication with the data output device is good, the data volume of the cached data is sufficient. A larger data volume of the cached data indicates better continuity of data playback.

200: Whether the data volume of the cached data is less than a first predetermined threshold, and step 500*a* is performed if the data volume of the cached data is less than the first predetermined threshold. Step 400 is performed if the data volume of the cached data is not less than the first predetermined threshold.

The first predetermined threshold is a value that may be defined by a skilled person according to actual needs. The first predetermined threshold provides a qualitative judgment criterion to determine whether the data volume of the received data is sufficient, which ensures smoothness of data playback to a greater extent.

If the data volume of the cached data is greater than the first predetermined threshold, the cached data is large, which ensures continuity of data playback within a long period of time, and imposes a small demand for receiving data. If the data volume of the cached data is less than the first predetermined threshold, the cached data is insufficient, and the speed of receiving data needs to be improved.

500*a*: A Bluetooth communication bandwidth is preferentially allocated to receive the source data.

As described above, the first audio playback device and the second audio playback device forward data therebetween by sharing the Bluetooth communication module. Therefore, in addition to receiving the source data, the Bluetooth communication module of the first audio playback device further needs to be used in forwarding the source data to the second audio playback device (step 300).

400: Whether a data volume of the to-be-forwarded source data is greater than a second predetermined threshold is judged, and step 500*b* is performed if the data volume of the to-be-forwarded source data is greater than the second predetermined threshold.

Similar to the first predetermined threshold, the second predetermined threshold may also be a value that may be defined by a skilled person according to actual needs. The second predetermined threshold provides a qualitative judgment criterion to determine whether there is a need to forward data, which ensures continuity of data playback of the second audio playback device.

If the data volume of the to-be-forwarded source data is large, it may be considered that the to-be-forwarded source data needs to be timely sent to the second audio playback device. If the to-be-forwarded source data is not timely sent to the second audio playback device, playback by the second audio playback device may be interrupted or instable due to insufficient received data.

500*b*: A Bluetooth communication bandwidth is preferentially allocated to forward the source data. The expression "preferentially allocated" in steps 500*a* and 500*b* are used to indicate an emphasized part in the Bluetooth communication bandwidth allocation process.

Preferentially allocating the Bluetooth communication bandwidths to implement some functions (that is, forwarding the source data or receiving the source data), means that, relative to general cases, more Bluetooth communication bandwidth resources are allocated to implement the corresponding functions. For example, in general cases, forwarding the source data and receiving the source data each occupy 50% of the total Bluetooth communication bandwidths. When the Bluetooth communication bandwidth is preferentially allocated to forward the source data, more Bluetooth communication bandwidths, for example, 70% of the total Bluetooth communication bandwidths, are allocated to forward the source data.

In practice, any suitable rule or definition may be used to determine the Bluetooth communication bandwidths that are practically allocated to forward the source data and receive the source data. Generally, when the data volume of the cached data is small or the data volume of the to-be-forwarded data is large, more Bluetooth communication bandwidth resources need to be allocated to implement the corresponding functions. For example, a function relationship or a mapping table between the allocated data proportion and the data volume of the cached data is established, a Bluetooth communication bandwidth in a corresponding proportion is allocated to receive the source data with variation of the data volume of the cached data according to a curve of the function relationship or the mapping table.

In the embodiments of the present disclosure, two standards, the first predetermined threshold and the second predetermined threshold, are used to determine the current Bluetooth data transmission condition, and a corresponding bandwidth adjustment approach is provided according to the standards. Therefore, bandwidth allocation adaptation may be implemented between data reception and data forwarding.

In the embodiment in which the first audio playback device shares the Bluetooth communication module to receive the source data and forward the source data, the Bluetooth communication module is capable of providing fixed Bluetooth communication bandwidths. That is, the sum of the Bluetooth communication bandwidth allocated to receive the source data and the Bluetooth communication bandwidth allocated to forward the source data is a fixed value. For ease of description, hereinafter a percentage of the Bluetooth communication bandwidths is used to represent the Bluetooth communication bandwidth allocated to receive the source data.

Return to FIG. 4, in some other embodiments, upon step 400, if the data volume of the to-be-forwarded source data is less than the second predetermined threshold, the method may include: averagely allocating the Bluetooth communication bandwidths (500*c*).

Step 500*c* is a general Bluetooth bandwidth allocation process. If the two standards are neither satisfied, it may be considered that data forwarding and data reception are in a balanced state, and thus it is unnecessary to preferentially allocate a Bluetooth communication bandwidth to any of data forwarding and data reception. In this case, practicing the average allocation in step 402 to match with the current Bluetooth communication condition.

By setting the first and second predetermined thresholds, three different Bluetooth bandwidth allocation schemes may be provided, which respectively correspond to steps 500a to 500c. The first audio playback device may determine the data volumes of the cached data and the to-be-forwarded data according to the communication condition, and adaptively adjust allocation of the Bluetooth communication bandwidth.

In some scenarios, there may be only one first audio playback device and one second audio playback device (for example, a Bluetooth stereo headphone). However, in some other scenarios, there may be two or more than two second audio playback devices (for example, a 5.1 channel speaker). The first audio playback device needs to forward the source data to a plurality of second audio playback devices.

Figure 5:
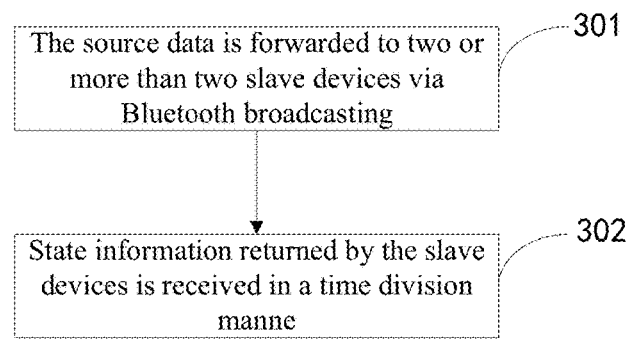
FIG. 5 is a flowchart of a method for forwarding data according to an embodiment of the present disclosure.

To further improve the utilization rate of the Bluetooth communication module, FIG. 5 is a schematic flowchart of forwarding source data by a first audio playback device according to an embodiment of the present disclosure.

As illustrated in FIG. 5, the method can include the following steps:

301: The source data is forwarded to two or more slave devices via Bluetooth broadcasting. The first audio playback device simultaneously forwards the source data to a plurality of second audio playback devices (slave devices) via broadcasting.

302: State information returned by the slave devices is received in a time division manner. Since the forwarding is carried out still based on Bluetooth communication, the second audio playback device generally needs to return some relevant state information reflecting data reception and other conditions to the first audio playback device. For example, the second audio playback device may need to notify the first audio playback device that some data packets are not acquired and need to be re-sent, or notify the first audio playback device of the current device state of the second audio playback device.

Figure 6:
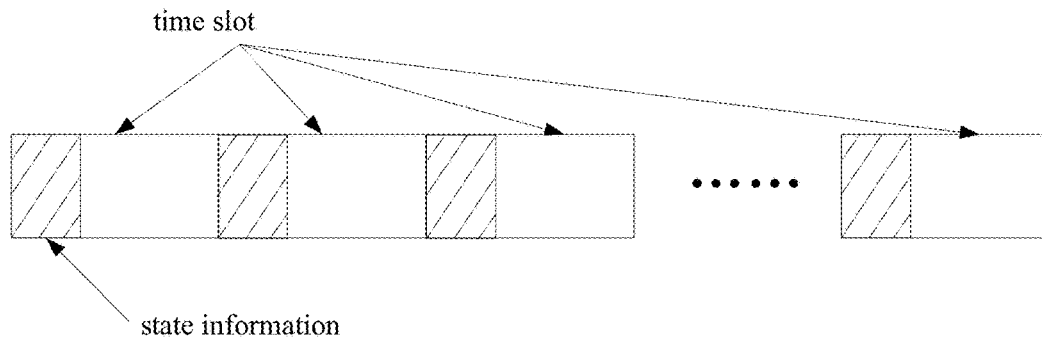
FIG. 6 is a typical schematic diagram of timeslots for receiving state information returned by a plurality of second devices.

FIG. 6 is a typical manner of forwarding source data by a first device to a plurality of second devices. The first device separately forwards the source data to each of the second devices. As illustrated in FIG. 6, in the Bluetooth communication protocol, each time slot is 652 μs (that is, a minimum communication unit). The Bluetooth communication module only allows one second device to communicate therewith each time (a point-to-multipoint topological structure based on one physical channel). Therefore, if there are more second devices, more Bluetooth communication bandwidth resources are needed for data forwarding.

In practice, as illustrated in FIG. 6, the data volume of the state information returned by the second audio playback device is generally far less than a timeslot. Therefore, if the typical manner as illustrated in FIG. 6 is employed, the utilization rate of the Bluetooth communication module is low, and the amount of state information contained in each timeslot is small.

Figure 7:
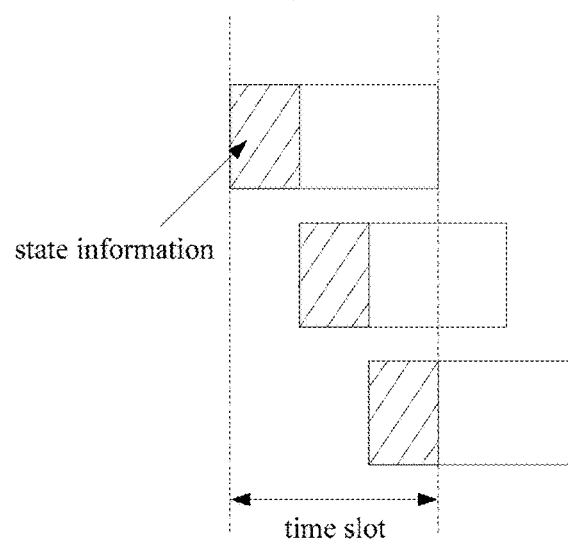
FIG. 7 is a schematic diagram of timeslots for receiving state information returned by a plurality of second devices according to an embodiment of the present disclosure.

FIG. 7 is a schematic diagram of forwarding source data by a first device to a plurality of second devices according to an embodiment of the present disclosure. As illustrated in FIG. 7, when the state information returned by the second devices is received in step 302, a time-division-based receiving policy is used. That is, the timeslots corresponding to the plurality of second devices are staggered (a stagger length is determined according to the data volume of the returned state information).

In this way, the Bluetooth communication module is capable of receiving state information from a plurality of different second devices (for example, three second devices as illustrated in FIG. 7) within one timeslot. This effectively improves the utilization rate, and reduces the Bluetooth communication bandwidths needed for data forwarding if there are many second devices.

It should be noted that since the apparatus embodiments and the method embodiments are based on the same inventive concept, and technical contents in the method embodiments may also be applied to the apparatus embodiments, which are thus not described herein any further.

Figure 8:
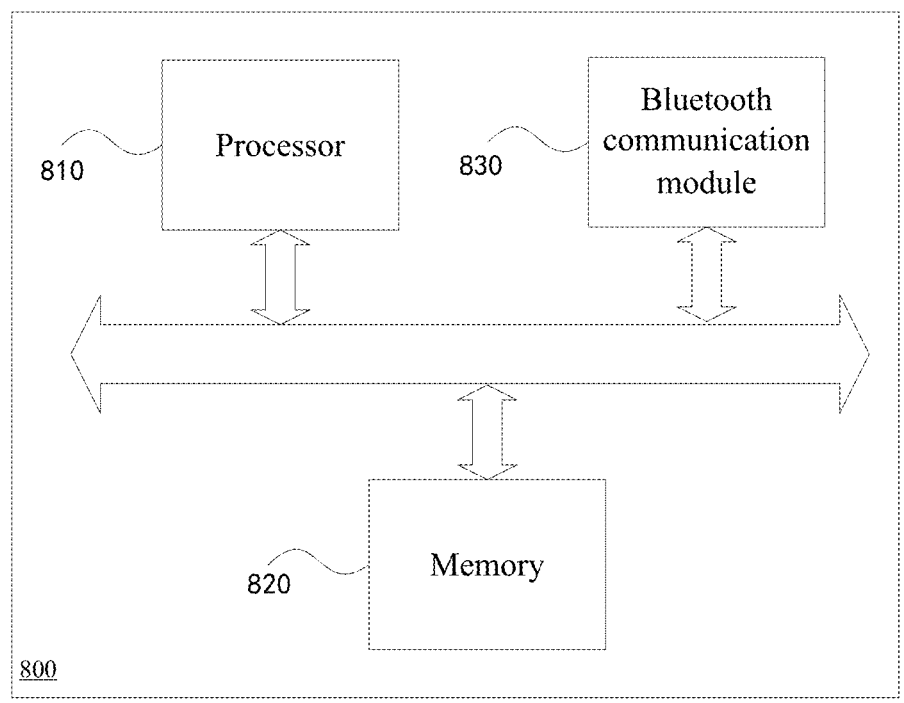
FIG. 8 is a structural block diagram of an electronic device according to an embodiment of the present disclosure.

FIG. 8 is a schematic structural diagram of an electronic device including a first audio playback device and a second audio playback device according to an embodiment of the present disclosure. As illustrated in FIG. 8, the electronic device 800 includes: at least one processor 810, a memory 820 and a Bluetooth communication module 830. FIG. 8 illustrates one processor 810 as an example. In some embodiments, the electronic device may further includes an input device and an output device.

The processor, the memory, the input device and the output device may be connected to each other via a bus or in another manner. FIG. 8 uses connection via a bus as an example for description.

The memory 820, as a non-volatile computer readable storage medium, may be configured to store non-volatile software programs, non-volatile computer executable programs and modules, for example, the program instructions/modules corresponding to the methods for forwarding Bluetooth data in the embodiments of the present application (for example, the receiving module 310, the caching module 320, the forwarding module 330 and the adjusting module 340 as illustrated in FIG. 3). The non-volatile software programs, instructions and modules stored in the memory 810, when being executed, cause the processor 820 to perform various function applications and data processing of a server, and perform the methods for forwarding Bluetooth data in the above method embodiments via the Bluetooth communication module.

The memory 820 may include a program memory area and data memory area, wherein the program memory area may store operation systems and application programs needed by at least function; and the data memory area may store data created according to the usage of the apparatus for forwarding Bluetooth data. In addition, the memory 820 may include a high speed random access memory, or include a non-volatile memory, for example, at least one disk storage device, a flash memory device, or another non-volatile solid storage device. In some embodiments, the memory 820 optionally includes memories remotely configured relative to the processor 810. These memories may be connected to a data forwarding apparatus over a network. The above examples include, but not limited to, the Internet, Intranet, local area network, mobile communication network and a combination thereof.

The input device may receive input digital or character information, and generate signal input related to user settings and function control of the apparatus for forwarding Bluetooth data. The output device may include a display screen or the like display device. The one or more modules are stored in the memory 820, and when being executed by the at least one processor 810, the one or more modules perform the data forwarding method in any of the above method embodiments.

A person skilled in the art should be further aware that with reference to the embodiments of the present disclosure disclosed herein, various exemplary Bluetooth communication steps may be implemented in the form of electronic hardware, computer software or a combination thereof. To clearly describe interchangeability between the hardware and software, the above description has generally illustrates the compositions and steps of the various example according to the functions. Whether such functions are implemented in the form of software or hardware depends on the specific application and the design restrictions applied to the entire system.

A person skilled in the art may implement the described functions by using different methods for each specific application. However, such implementation shall not be deemed as going beyond the scope of the present disclosure. The computer software program may be stored in a computer readable storage medium, wherein the computer software program, when being executed, may perform the steps and processes according to the above method embodiments. The storage medium may be any medium capable of storing program codes, such as read-only memory (ROM), a random access memory (RAM), a magnetic disk, or a compact disc-read only memory (CD-ROM).

Described above are exemplary embodiments of the present disclosure, but are not intended to limit the scope of the present disclosure. Any equivalent structure or equivalent process variation made based on the specification and drawings of the present disclosure, which is directly or indirectly applied in other related technical fields, fall within the scope of the present disclosure.

What is claimed is:

1. A method for Bluetooth data forwarding, comprising:
in a Bluetooth communication process, receiving source data from a data output device as cached data, and forwarding the source data; and
preferentially allocating a Bluetooth communication bandwidth to receive the source data if a data volume of the cached data is less than a first predetermined threshold; or
preferentially allocating a Bluetooth communication bandwidth to forward the source data if a data volume of to-be-forwarded source data is greater than a second predetermined threshold.

2. The method according to claim 1, further comprising: averagely allocating the Bluetooth communication bandwidth if the data volume of the cached data is grater than the first predetermined threshold and the data volume of the to-be-forwarded source data is less than the second predetermined threshold.

3. The method according to claim 1, wherein the forwarding the source data in a Bluetooth communication process comprises:
forwarding the source data to two or more slave devices via Bluetooth broadcasting; and
receiving in a time division manner state information returned by the slave devices.

4. The method according to claim 1, wherein the preferentially allocating a Bluetooth communication bandwidth to receive the source data if a data volume of the cached data is less than a first predetermined threshold comprises:
allocating, according to the data volume of the cached data, a corresponding Bluetooth communication bandwidth to receive the source data.

5. The method according to claim 1, wherein the preferentially allocating a Bluetooth communication bandwidth to forward the source data if a data volume of the cached data is greater than a second predetermined threshold comprises:
allocating, according to the data volume of the to-be-forwarded source data, a corresponding Bluetooth communication bandwidth to forward the source data.

6. An electronic device, comprising:
a memory, a communication module and a processor coupled to the memory and the communication module;
the memory storing instructions that are executable by the processor, wherein execution of the instructions by the processor causes the processor via the communication module to:
in a Bluetooth communication process, receiving source data from a data output device as cached data, and forwarding the source data; and
preferentially allocating a Bluetooth communication bandwidth to receive the source data if a data volume of the cached data is less than a first predetermined threshold; or
preferentially allocating a Bluetooth communication bandwidth to forward the source data if a data volume of to-be-forwarded source data is greater than a second predetermined threshold.

7. The electronic device according to claim 6, wherein execution of the instructions by the processor further causes the processor to: averagely allocating the Bluetooth communication bandwidth if the data volume of the cached data is grater than the first predetermined threshold and the data volume of the to-be-forwarded source data is less than the second predetermined threshold.

8. The electronic device according to claim 6, wherein the forwarding the source data in a Bluetooth communication process comprises:
forwarding the source data to two or more slave devices via Bluetooth broadcasting; and receiving in a time division manner state information returned by the slave devices.

9. The electronic device according to claim 6, wherein the preferentially allocating a Bluetooth communication bandwidth to receive the source data if a data volume of the cached data is less than a first predetermined threshold comprises:
allocating, according to the data volume of the cached data, a corresponding Bluetooth communication bandwidth to receive the source data.

10. The electronic device according to claim 6, wherein the preferentially allocating a Bluetooth communication bandwidth to forward the source data if a data volume of the cached data is greater than a second predetermined threshold comprises:
allocating, according to the data volume of the to-be-forwarded source data, a corresponding Bluetooth communication bandwidth to forward the source data.

11. A Bluetooth device, comprising a master device configured to receive source data from a data output source and forward the source data, and at least one slave devices configured to receive the forwarded source data; wherein
the master device comprises a Bluetooth communication module, a memory and a processor coupled to the Bluetooth communication module and the memory, wherein the memory is configured to store instructions executable by the processor, the processor is configured to execute the instructions and multiplex in a time division manner the Bluetooth communication module to: in a Bluetooth communication process, receive source data from a data output device as cached data, and forward the source data;

wherein a Bluetooth communication bandwidth is preferentially allocated to receive the source data if a data volume of the cached data is less than a first predetermined threshold; or a Bluetooth communication bandwidth is preferentially allocated to forward the source data if a data volume of to-be-forwarded source data is greater than a second predetermined threshold.

12. The Bluetooth device according to claim 11, wherein the master device forwards, via the Bluetooth communication module, the source data to the at least one slave device by broadcasting; and the Bluetooth communication module of the master device receive a state of the at least one slave device in a time division manner.

13. A Bluetooth system, comprising a data output device configured to provide source data, a first device configured to establish Bluetooth communication with the data output device, and second devices; wherein
the first device is a slave device relative to the data output device, and is a master device relative to the second devices;
the first device is configured to receive source data sent by the data output device and cache the source data, and preferentially allocate a Bluetooth communication bandwidth to receive the source data if a data volume of the cached data is less than a first predetermined threshold; and
the first device is configured to forward the received source data to the second devices, and preferentially allocate a Bluetooth communication bandwidth to forward the source data if a data volume of to-be-forwarded source data is greater than a second predetermined threshold.

* * * * *